(12) United States Patent
Nakazono

(10) Patent No.: US 11,358,230 B2
(45) Date of Patent: Jun. 14, 2022

(54) END MILL AND METHOD FOR MANUFACTURING MACHINED PRODUCT

(71) Applicant: KYOCERA CORPORATION, Kyoto (JP)

(72) Inventor: Yoji Nakazono, Higashiomi (JP)

(73) Assignee: KYOCERA Corporation, Kyoto (JP)

(*) Notice: Subject to any disclaimer, the term of this patent is extended or adjusted under 35 U.S.C. 154(b) by 322 days.

(21) Appl. No.: 16/618,168

(22) PCT Filed: May 24, 2018

(86) PCT No.: PCT/JP2018/019918
§ 371 (c)(1),
(2) Date: Nov. 29, 2019

(87) PCT Pub. No.: WO2018/221362
PCT Pub. Date: Dec. 6, 2018

(65) Prior Publication Data
US 2021/0138562 A1 May 13, 2021

(30) Foreign Application Priority Data
May 30, 2017 (JP) .............................. JP2017-106222

(51) Int. Cl.
*B23C 5/10* (2006.01)

(52) U.S. Cl.
CPC ..................................... *B23C 5/10* (2013.01)

(58) Field of Classification Search
CPC ........ B23C 2210/203; B23C 2210/084; B23C 2210/40; B23C 2210/64; B23C 2210/285; B23C 2210/54; B23C 5/10; B23C 5/1009
See application file for complete search history.

(56) References Cited

U.S. PATENT DOCUMENTS 4,411,563 A * 10/1983 Moon .................... B23B 51/02
407/54
5,833,402 A 11/1998 Martin
(Continued)

FOREIGN PATENT DOCUMENTS

DE 69507191 T2 6/1999
JP H1080816 A 3/1998
(Continued)

OTHER PUBLICATIONS

JP 2011156622 A Machine Translation, pp. 3-5 (Year: 2021).*

*Primary Examiner* — Nicole N Ramos
(74) *Attorney, Agent, or Firm* — Viering, Jentschura & Partner mbB

(57) ABSTRACT

An end mill may include a main body having a bar shape extending from a first end to a second end. The main body may include a plurality of cutting edges located at the first end, and a plurality of flutes individually extended from the cutting edges toward the second end. The cutting edges may include a plurality of long cutting edges and a plurality of short cutting edges. The long cutting edges include a first long cutting edge. N1 is the number of the short cutting edges located forwards in a rotation direction with respect to the first long cutting edge. N2 is the number of the short cutting edges located backwards, opposite the rotation direction with respect to the first long cutting edge. And, N1 is different from N2.

12 Claims, 9 Drawing Sheets

(56) References Cited

U.S. PATENT DOCUMENTS

| | | | | |
|---|---|---|---|---|
| 7,997,834 B2* | 8/2011 | Aoki | ................ | B23C 5/10 |
| | | | | 407/54 |
| 9,050,666 B2 | 6/2015 | Kuroda | | |
| 2004/0120777 A1* | 6/2004 | Noland | ................ | B23C 5/10 |
| | | | | 407/63 |
| 2009/0092452 A1* | 4/2009 | Sato | ................ | B23C 5/10 |
| | | | | 407/54 |
| 2011/0085862 A1* | 4/2011 | Shaffer | ................ | B23C 5/10 |
| | | | | 407/54 |
| 2013/0078044 A1* | 3/2013 | Sharivker | ................ | B23C 5/10 |
| | | | | 407/54 |
| 2014/0119844 A1* | 5/2014 | Osawa | ................ | B23C 5/10 |
| | | | | 407/54 |

FOREIGN PATENT DOCUMENTS

| | | | |
|---|---|---|---|
| JP | H10151511 A | | 6/1998 |
| JP | 2011156622 A | * | 8/2011 |
| JP | 2011183532 A | | 9/2011 |

\* cited by examiner ated in FIG. 1 and the like. The first
END MILL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/019918 filed on May 24, 2018, which claims priority to Japanese Application No. 2017-106222 filed on May 30, 2017, which are entirely incorporated herein by reference.

TECHNICAL FIELD

The present disclosure relates to end mills as a rotary tool for use in a milling process.

BACKGROUND

An example of a rotary tool for use in a milling process of a workpiece, ball end mills, are discussed in Japanese Unexamined Patent Publication No. 10-080816 (Patent Document 1) and Japanese Unexamined Patent Publication No. 2011-183532 (Patent Document 2). Each of the ball end mills discussed in Patent Documents 1 and 2 may include a ball edge as a cutting edge located at a side of a front end. The ball edge may include a long ball edge reaching the front end, which is generally called a long cutting edge, and a short ball edge not reaching the front end, which is generally called a short cutting edge. The long cutting edges may be periodically disposed if viewed toward the front end in the ball end mills discussed in Patent Documents 1 and 2.

Because the long cutting edges are periodically disposed in the ball end mills discussed in Patent Documents 1 and 2, a cutting load tends to change periodically and vibration called chatter vibration tends to occur during a cutting process. Hence, such ball mills may benefit from reduced chatter vibration from the viewpoint of smoothness of a machined surface.

SUMMARY

An end mill in a non-limiting embodiment may include a main body having a bar shape which is rotatable around a rotation axis and is extended from a first end to a second end. The main body may include a plurality of cutting edges located at a side of the first end, and a plurality of flutes individually extended from the cutting edges toward the second end. If the main body is viewed from a side of the first end, the cutting edges may include a plurality of long cutting edges extended from the rotation axis toward an outer periphery, and a plurality of short cutting edges extended from a position far away from the rotation axis toward the outer periphery. The long cutting edges may include a first long cutting edge. N1 is the number of the short cutting edges located in a range from the first long cutting edge to the long cutting edge located on a front side in a rotation direction with respect to the first long cutting edge, and N2 is the number of the short cutting edges located in a range from the first long cutting edge to the long cutting edge located on a rear side in the rotation direction with respect to the first long cutting edge. The value of N1 may be different from that of N2.

DETAILED DESCRIPTION

<End Mill>

Figure 1:
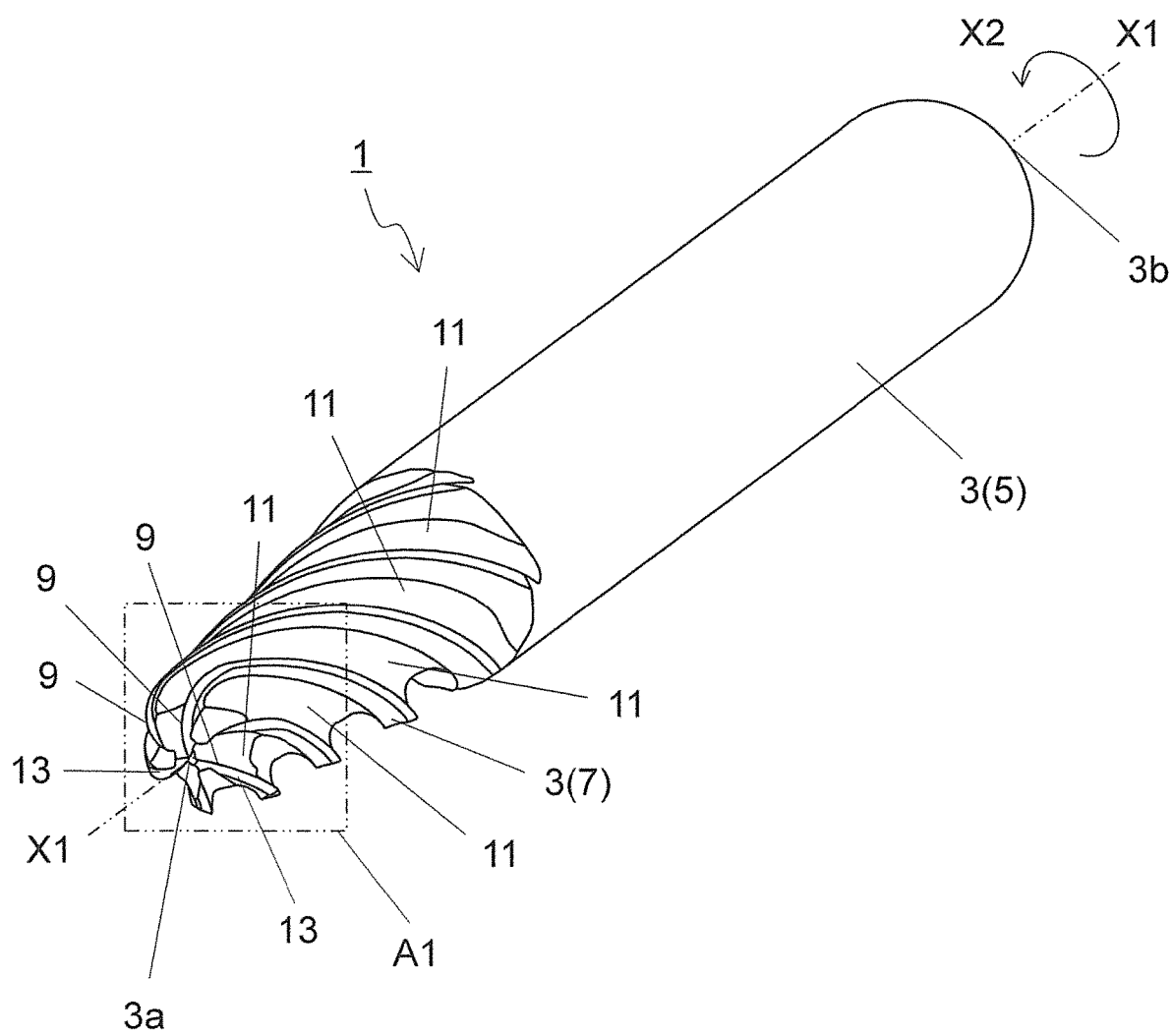
FIG. 1 is a perspective view illustrating an end mill in a non-limiting embodiment.

An end mill 1 in a non-limiting embodiment is described in detail below with reference to the drawings. Although the non-limiting embodiments illustrate a ball end mill as the end mill 1, the end mill 1 is not limited to a ball end mill. Alternatively, the end mill 1 may be, for example, a square end mill, a radius end mill, or a formed end mill.

For the sake of description, the drawings referred to in the following illustrate, in a simplified form, main members of those constituting the non-limiting embodiments. The end mill 1 is therefore capable of including any arbitrary structural member not illustrated in the drawings referred to. Sizes of the members in each of the drawings faithfully represent neither sizes of actual structural members nor size ratios of these members.

The end mill 1 in the present non-limiting embodiment may include a main body 3 having a bar shape which has a rotation axis X1 and is extended from a first end 3a to a second end 3b as illustrated in FIG. 1 and the like. The first end 3a may be overlapped with the rotation axis X1 in the non-limiting embodiments. In general, the first end 3a is called "a front end" and the second end 3b is called "a rear end." The main body 3 may be rotatable around the rotation axis X1, and may be rotated around the rotation axis X1 in the step of cutting out a workpiece for manufacturing a machined product. Arrow X2 in FIG. 1 and the like may indicate a rotation direction of the main body 3.

Because the end mill 1 is a tool used by rightward rotation in the non-limiting embodiments, the rotation direction X2 corresponds to counterclockwise rotation if the main body 3 is viewed toward the first end 3a. The end mill 1 is, however, not limited to the above non-limiting embodiments. There is no problem even if the end mill 1 is, for example, a tool used by leftward rotation and a rotation direction thereof corresponds to clockwise rotation.

The main body 3 may be composed of a holding part 5 called "a shank" and a cutting part 7 called "a body." The holding part 5 may be the part to be held by, for example, a spindle in a machine tool (not illustrated). A shape of the holding part 5 may be therefore designed according to a shape of the spindle. The cutting part 7 may be located closer to a side of the first end 3a than the holding part 5. The cutting part 7 may be the part that is brought into contact with a workpiece and plays a major role in the cutting process of the workpiece.

The main body 3 may be composed only of a single member or a plurality of members. The holding part 5 and the cutting part 7 may be integrally formed and the main body 3 is composed only of the single member in the non-limiting embodiments. If the main body 3 is composed only of the single member, the end mill is generally called "a solid end mill."

As an end mill in which the main body 3 is composed of a plurality of members, there is, for example, an edge replaceable end mill in which the main body 3 is comprised of a holder and an insert that is attached to the holder and includes a cutting edge.

The main body 3 may include a plurality of cutting edges 9 and a plurality of flutes 11 in the non-limiting embodiments. The plurality of cutting edges 9 may be individually located at a side of the first end 3a in the main body 3. These cutting edges 9 are generally called a front end cutting edge or bottom cutting edge. The cutting edge 9 may be therefore referred to as the front end cutting edges 9 in the following description. The phrase that "the front end cutting edges 9 are located at the side of the first end 3a" may denote that they may be relatively located closer to the first end 3a than the second end 3b, but not necessarily limited to such a configuration that they are located so as to include the first end 3a.

The front end cutting edges 9 may should be able to come into contact with a workpiece in the step of cutting out a workpiece. Depending on machining conditions (for example, rotation speed and feed rate of the end mill), the entirety of the front end cutting edges 9 may not necessarily come into contact with the workpiece, but these front end cutting edges 9 may partially come into contact with the workpiece.

The plurality of flutes 11 may be individually extended from the front end cutting edges 9 toward the second end 3b. Although the flutes 11 are not limited to a specific configuration, the flutes 11 may be individually located on the outer periphery of the main body 3 and may be twisted so as to approach a rear side in the rotation direction X2 as going toward the second end 3b in the non-limiting embodiment illustrated in FIG. 1. A helix angle of the flutes 11 may be indicated by θ. Although the helix angle θ is not limited to a specific value, it may be settable to, for example, 5-45°.

The main body 3 may include an end surface 13 located at a side of the first end 3a and may intersect with the flutes 11 in the non-limiting embodiments. In other words, the front end cutting edges 9 may be located on at least a part of a ridge line where the end surface 13 intersects with the flutes 11. Alternatively, a region in each of the flutes 11 which is located along the front end cutting edge 9 may serve as a rake surface. A region in the end surface 13 which is located along the front end cutting edge 9 may serve as a flank surface.

The front end cutting edges 9 may include a plurality of long cutting edges 15 and a plurality of short cutting edges 17 in the non-limiting embodiments. If the main body 3 is viewed toward the first end 3a as illustrated in FIG. 3, the long cutting edges 15 may be individually extended from the rotation axis X1 toward the outer periphery of the main body 3, and the short cutting edges 17 may be extended toward the outer periphery from a position far away from the rotation axis X1.

Figure 2:
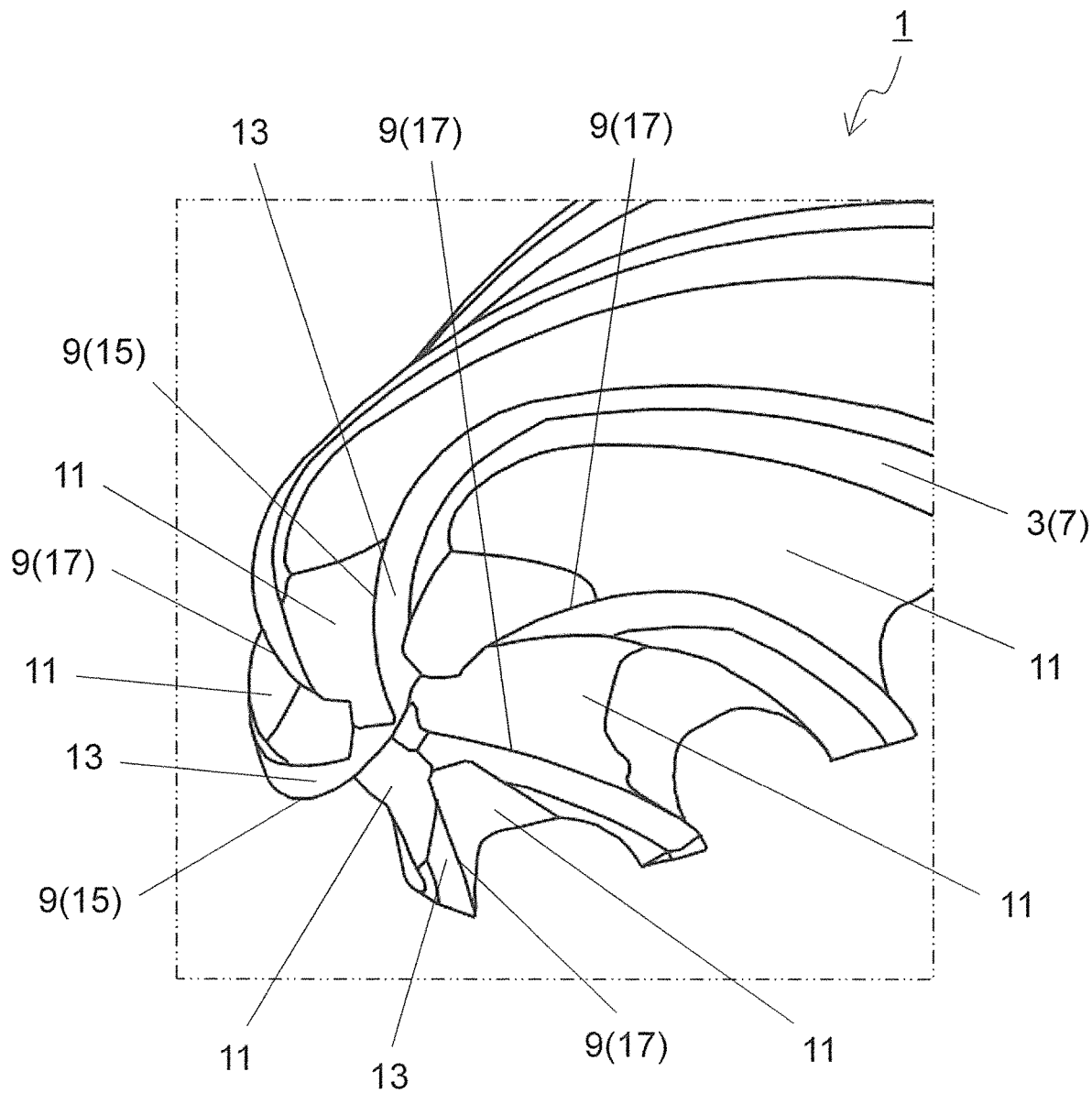
FIG. 2 is an enlarged view of a region A1 in FIG. 1.
Figure 3:
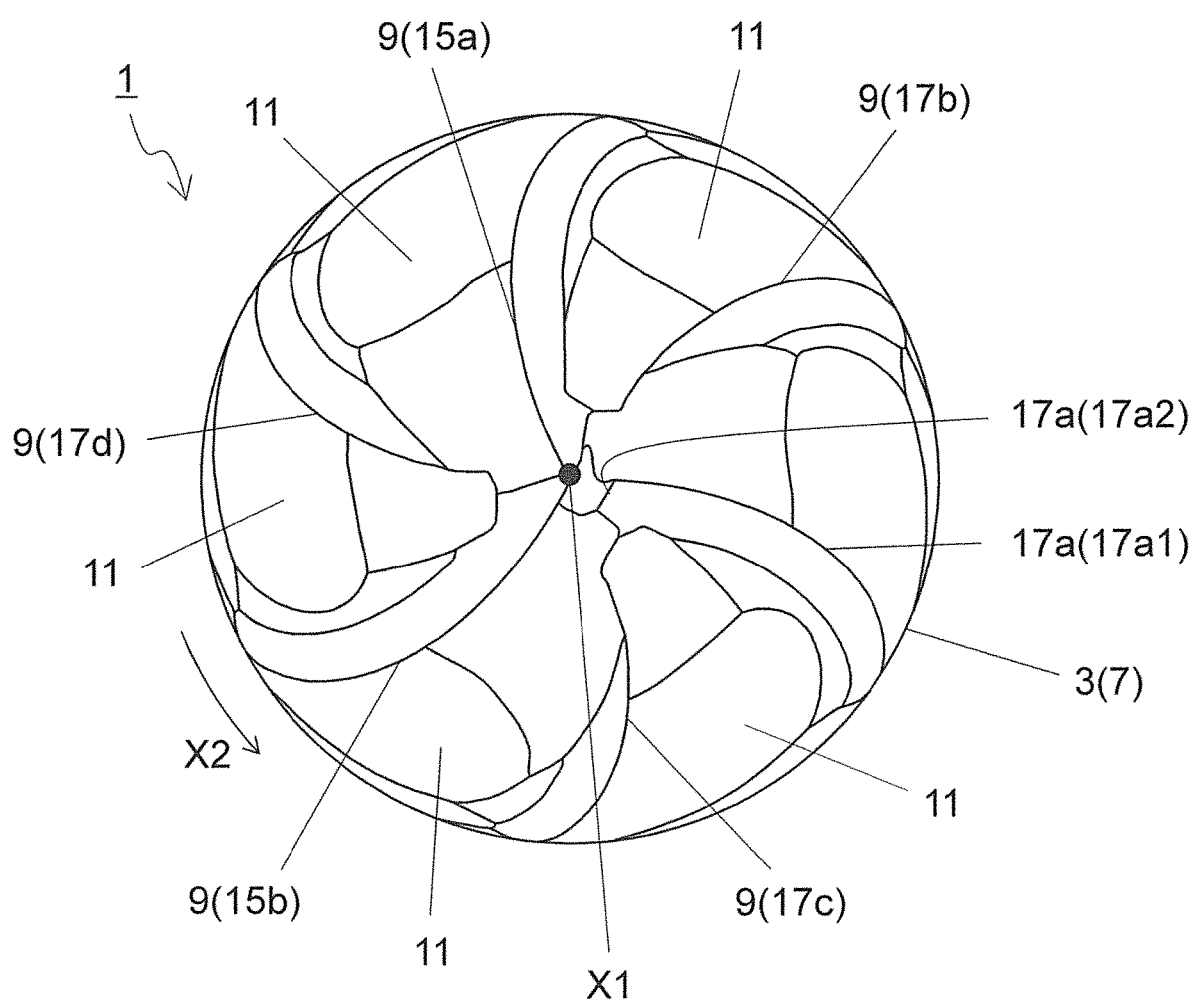
FIG. 3 is a plane view if the end mill illustrated in FIG. 1 is viewed toward a first end.
Figure 4:
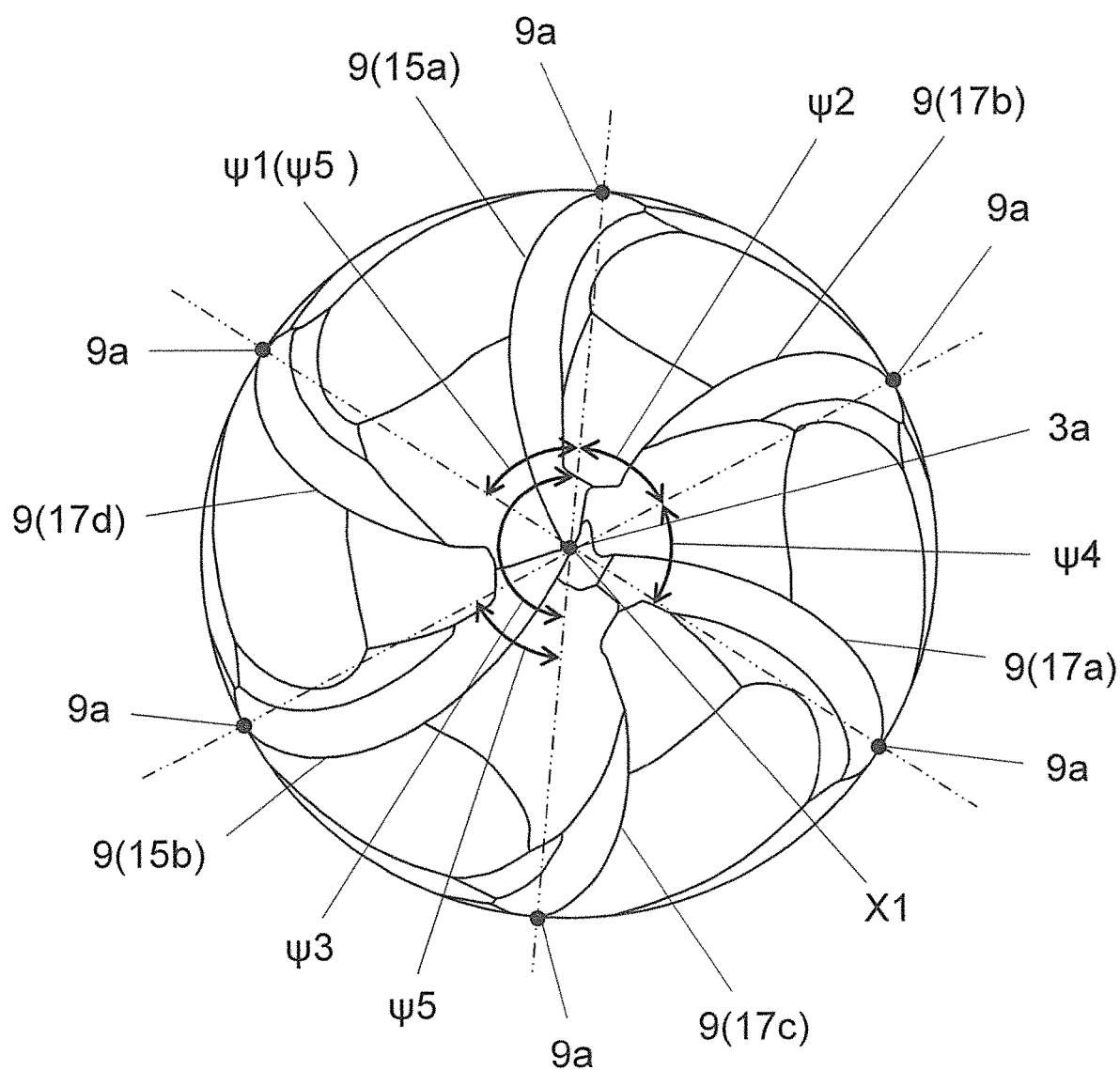
FIG. 4 is a plane view which is identical to the end mill illustrated in FIG. 3.
Figure 5:
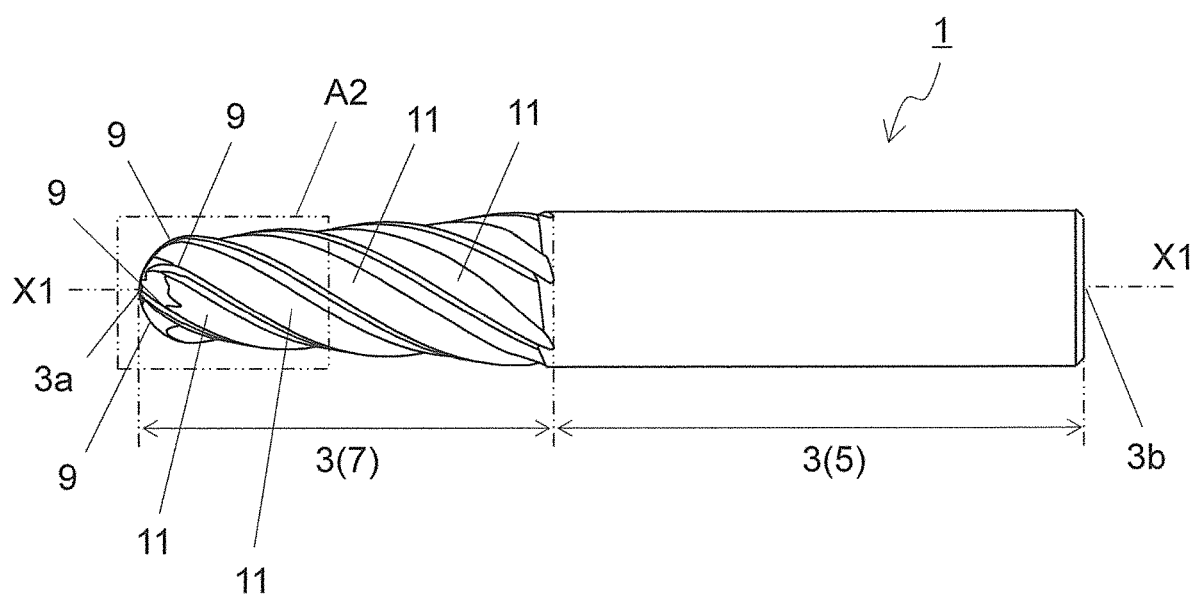
FIG. 5 is a side view if the end mill illustrated in FIG. 1 is viewed from a B1 direction.
Figure 6:
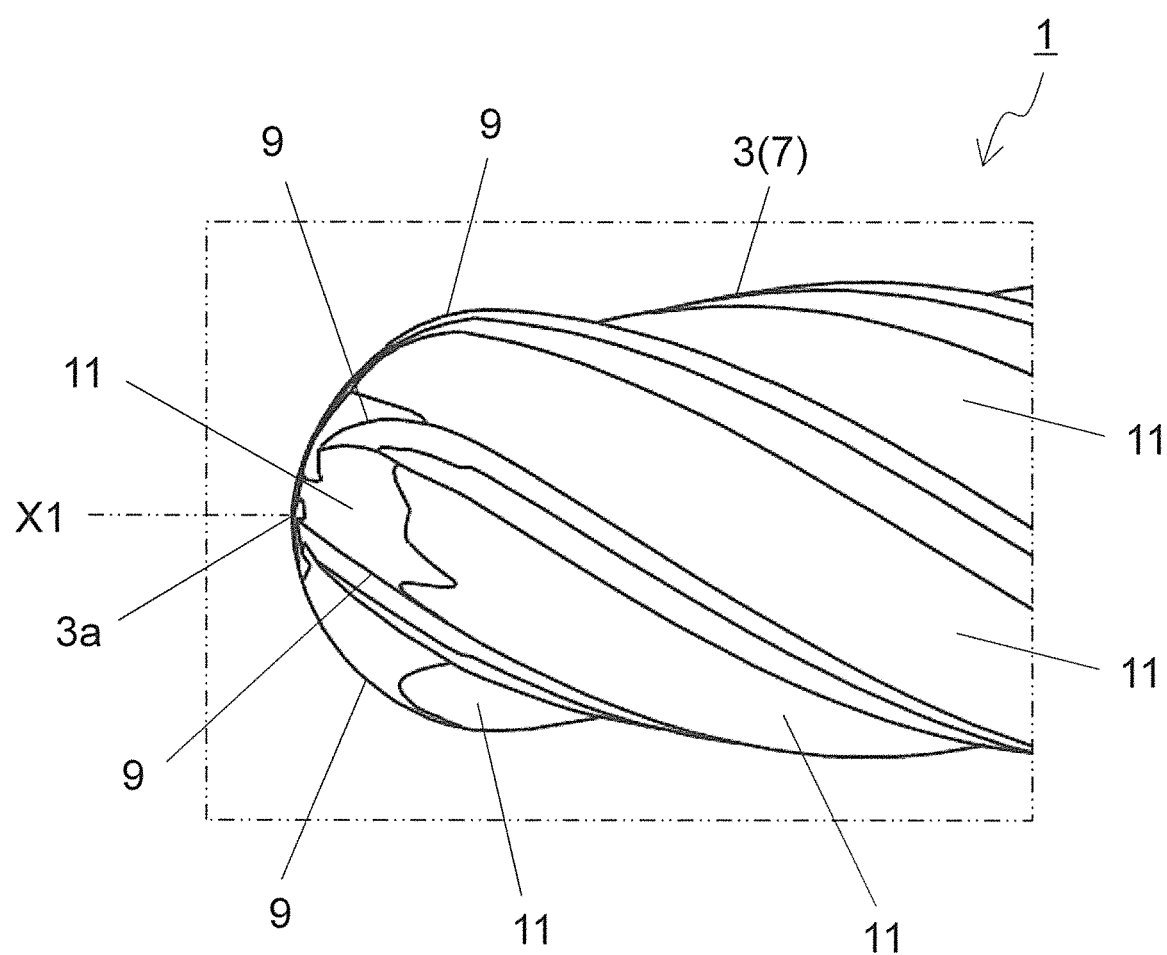
FIG. 6 is an enlarged view of a region A2 in FIG. 5.

In the non-limiting embodiment illustrated in FIG. 3, each of the long cutting edges 15 and the short cutting edges 17 may include a convex curvilinear shaped portion in a direction toward a front side in the rotation direction X2. The long cutting edges 15 and the short cutting edges 17 may be curved so as to approach the second end 3b as going toward the outer periphery of the main body 3 as illustrated in FIG. 2. An end portion of each of the long cutting edges 15 which is located at a side of the rotation axis X1 may be located closer to the first end 3a than an end portion of each of the short cutting edges 17 which is located at a side of the rotation axis X1.

The front end cutting edges 9 may include two long cutting edges 15 and four short cutting edges 17 in the non-limiting embodiments. The numbers of the long cutting edges 15 and the short cutting edges 17 are not limited to the above numbers. For example, the front end cutting edge 9 may include two long cutting edges 15 and two short cutting edges 17 or, alternatively, three long cutting edges 15 and six short cutting edges 17.

In cases where one of the front end cutting edges 9 is referred to as a first long cutting edge 15a in the non-limiting embodiments, N1 may indicate the number of the short cutting edges 17 located in a range from the first long cutting edge 15a to the long cutting edge 15 located on a front end in the rotation direction X2 of the rotation axis X1 with respect to the first long cutting edge 15a, and N2 may indicate the number of the short cutting edges 17 located in a range from the first long cutting edge 15a to the long cutting edge 15 (the second long cutting edge 15b in the drawing) located on a rear end in the rotation direction X2 with respect to the first long cutting edge 15a. In this case, N1 may be different from N2.

Specifically, the front end cutting edges 9 may include the first long cutting edge 15a and the second long cutting edge 15b in the non-limiting embodiment illustrated in FIG. 3. The front end cutting edge 9 may further include a first short cutting edge 17a, a second short cutting edge 17b, a third short cutting edge 17c and a fourth short cutting edge 17d. These long cutting edges 15 and these short cutting edges 17 may be arranged on the basis of the first long cutting edge 15a in the following order: the first long cutting edge 15a, the fourth short cutting edge 17d, the second long cutting edge 15b, the third short cutting edge 17c, the first short cutting edge 17a and the second short cutting edge 17b on a front side in the rotation direction X2 of the rotation axis X1 with respect to the first long cutting edge 15a. Hence, N1=1 and N2=3.

The number of the short cutting edges 17, specifically, the value of N1 (=1) may be different from the value of N2 (=3) in the non-limiting embodiments. Thus, N1 and N2, each being the number of the short cutting edges 17, may be different from each other, and the long cutting edges 15 may not be disposed periodically. This may make it easier to avoid cases where time during which the first long cutting edge 15a comes into contact with a workpiece and thereafter the second long cutting edge 15b comes into contact with the workpiece roughly coincides with time during which the second long cutting edge 15b comes into contact with the workpiece and thereafter the first long cutting edge 15a comes into contact with the workpiece. It may be therefore possible to reduce chatter vibration, thus leading to enhanced smoothness of a finished surface.

The configuration in which N1 is different from N2 is not limited to one in which N1=1 and N2=3 as described above. For example, if the front end cutting edge 9 includes the two long cutting edges 15 and the four short cutting edges 17, it may be configured so that N1=0 and N2=4. If the front end cutting edge 9 includes the two long cutting edges 15 and the two short cutting edges 17, it may be configured so that N1=0 and N2=2.

One of N1 and N2 may be 0. Alternatively, both N1 and N2 may be 1 or more. If both N1 and N2 are 1 or more, namely, if neither N1 nor N2 is 0, the plurality of long cutting edges 15 may not be continuous with each other, the short cutting edge 17 may be interposed between the long cutting edges 15. This may contribute to reducing variations in load applied to each of the long cutting edges 15, thereby making it possible for the long cutting edges 15 to efficiently carry out a cutting process.

Though not particularly illustrated in the drawings, if the front end cutting edge 9 includes three or more long cutting edges 15, N1 may be different from N2 in terms of the number of the short cutting edges 17 located between the long cutting edges 15 adjacent to each other in the rotation direction X2. In cases where the front end cutting edge 9 includes, as the long cutting edge 15, the first long cutting edge 15a, the second long cutting edge 15b and the third long cutting edge, N1 may indicate the number of the short cutting edges 17 located between the first long cutting edge 15a and the second long cutting edge 15b, N2 may indicate the number of the short cutting edges 17 located between the first long cutting edge 15a and the third long cutting edge, and N3 may indicate the number of the short cutting edges 17 located between the second long cutting edge 15b and the third long cutting edge. These numbers may have the following relationship.

If the front end cutting edge 9 includes the first long cutting edge 15a, the second long cutting edge 15b and the third long cutting edge or, alternatively, the value of N1 may be different from the value of N2, and N1 or N2 may have the same value as N3, such as (N1, N2, N3)=(1, 4, 1) or (N1, N2, N3)=(4, 1, 1). If N1, N2 and N3 are all different from one another, such as (N1, N2, N3)=(1, 2, 3), chatter vibration may be much less likely to occur.

A spacing angle ψ of the front end cutting edges 9 adjacent to each other in the direction along the rotation direction X2 may be constant or may vary. If the spacing angle ψ is approximately constant, it may be possible to reduce variations in cutting load applied to the front end cutting edges 9. For example, the main body 3 may include the six front end cutting edges 9 as in the end mill 1 in the non-limiting embodiments, the variations in the cutting load can be minimized if the spacing angle ψ of the front end cutting edges 9 adjacent to each other in the direction along the rotation direction X2 are individually approximately 60°.

The term "the spacing angle ψ of the front end cutting edges 9" may be evaluable by an angle between intersecting imaginary straight lines extended from the end portion 9a on an outer peripheral side toward the rotation axis X1 in each of two target front end cutting edges 9 in a plan view if the end mill 1 is viewed toward the first end 3a.

As described above, the variations in cutting load can be reduced if the spacing angle ψ of the front end cutting edges 9 adjacent to each other in the direction along the rotation direction X2 is approximately constant. Specifically, if the spacing angle ψ of the front end cutting edges 9 adjacent to each other in the direction along the rotation direction X2 is varied in a range of approximately 55-65° instead of being strictly constant, the chatter vibration can be further reduced while reducing the variations in cutting load applied to the front end cutting edges 9.

In cases where the main body 3 is viewed toward the first end 3a if the number of the front end cutting edges 9 is an even number of 4 or more and one of the front end cutting edges 9 is the first cutting edge, a spacing angle (a first spacing angle ψ1) formed by the first cutting edge and the front end cutting edges 9 adjacent to the first cutting edge on a front side in the rotation direction X2 may be different from a spacing angle (a second spacing angle ψ2) formed by the first cutting edge and the front end cutting edges 9 adjacent to the first cutting edge on a rear side in the rotation direction X2, and a spacing angle (a third spacing angle ψ3) formed by the first cutting edge and the front end cutting edge 9 located on an opposite side of the first cutting edge on the basis of the rotation axis X1 may be 180°. If the front end cutting edges 9 have the above configuration, the vibration of the end mill 1 can be minimized while reducing the chatter vibration, for example in a grooving process.

The reason for this may be as follows. The chatter vibration can be reduced with the configuration that the first spacing angle ψ1 is different from the second spacing angle ψ2. Furthermore, because the third spacing angle ψ3 is 180°, timing at which the first cutting edge comes into contact with a workpiece may be almost the same as timing at which the front end cutting edge 9 located on the opposite side of the first cutting edge on the basis of the rotation axis X1 comes into contact with the workpiece. Consequently, the vibration of the end mill 1 may be become small.

The number of the front end cutting edges 9 may be six (specifically, the two long cutting edges 15 and the four short cutting edges 17) and they may be arranged at approximately equal intervals along the rotation direction X2 in the non-limiting embodiments. For example, if the first long cutting edge 15a is the first cutting edge, a spacing angle formed by the first long cutting edge 15a and the fourth short cutting edge 17d may be correspond to the first spacing angle ψ1, a spacing angle formed by the first long cutting edge 15a and the second short cutting edge 17b may be correspond to the second spacing angle ψ2, and a spacing angle formed by the first long cutting edge 15a and the third short cutting edge 17c may be correspond to the third spacing angle ψ3.

The first spacing angle ψ1 may be different from the second spacing angle ψ2, and the third spacing angle ψ3 may be 180°. With the end mill 1 in the non-limiting embodiment, the chatter vibration during the cutting process can be reduced, and the vibration of the end mill 1 may be become smaller.

The long cutting edges 15 may have such a shape as to overlap with each other if rotated around the rotation axis X1 or, alternatively, such a shape as not to partially overlap with each other if rotated around the rotation axis X1. The first long cutting edge 15a and the second long cutting edge 15b in the non-limiting embodiment illustrated in FIG. 3 may have such a shape as to overlap with each other if rotated around the rotation axis X1.

Similarly to the long cutting edges 15, the short cutting edges 17 may have such a shape as to overlap with each other if rotated around the rotation axis X1 or, alternatively, such a shape as not to partially overlap with each other if rotated around the rotation axis X1. The first short cutting edge 17a, the second short cutting edge 17b, the third short cutting edge 17c and the fourth short cutting edge 17d may have such a shape as not to partially overlap with each other if rotated around the rotation axis X1 in the non-limiting embodiment illustrated in FIG. 3.

The first short cutting edge 17a may be located between the short cutting edges 17 adjacent to each other on the front side and the rear side in the rotation direction X2 in the non-limiting embodiment illustrated in FIG. 3. In other words, the front end cutting edges 9 adjacent to each other on the front side in the rotation direction X2 with respect to the first short cutting edge 17a and the front end cutting edges 9 adjacent to each other on the rear side in the rotation direction X2 with respect to the first short cutting edge 17a may be all the short cutting edges 17. In the non-limiting embodiment illustrated in the drawing, the second short cutting edge 17b may be located so as to become adjacent to the first short cutting edge 17a on the front side in the rotation direction X2, and the third short cutting edge 17c may be located so as to become adjacent to the first short cutting edge 17a on the rear side in the rotation direction X2.

The first short cutting edge 17a may be extended closer to the rotation axis X1 than the second short cutting edge 17b and the third short cutting edge 17c if the main body 3 is viewed toward the first end 3a.

The first short cutting edge 17a may be become usable as a pseudo long cutting edge 15 if the short cutting edges 17 have the above configuration. It may be therefore possible to reduce variations in cutting load applied to the long cutting edges 15, and consequently the vibration of the end mill 1 during a cutting process may be become small.

Because the first short cutting edge 17a is not used as the long cutting edge 15 but used as the pseudo long cutting edge 15, the durability of the third short cutting edge 17c can be enhanced if the second short cutting edge 17b is extended closer to the rotation axis X1 than the third short cutting edge 17c if the main body 3 is viewed toward the first end 3a.

If the main body 3 is viewed toward the first end 3a, the first short cutting edge 17a may be extended closer to the rotation axis X1 than the short cutting edges 17 other than the first short cutting edge 17a, namely, the second short cutting edge 17b, the third short cutting edge 17c and the fourth short cutting edge 17d. In other words, the first short cutting edge 17a among the short cutting edges 17 may be extended closest to the rotation axis X1 if the main body 3 is viewed toward the first end 3a. The variation in cutting load applied to the long cutting edges 15 can be further reduced if the short cutting edges 17 have the above configuration.

Although the first short cutting edge 17a is usable as the pseudo long cutting edge 15, the first short cutting edge 17a, which is one of the short cutting edges 17, may be extended from a position far away from the rotation axis X1 toward the outer periphery of the main body 3. If the main body 3 is viewed toward the first end 3a, a spacing angle formed by the first short cutting edge 17a and the second short cutting edge 17b adjacent to the first short cutting edge 17a on the front side in the rotation direction X2 may be indicated by ψ4, and a spacing angle formed by the long cutting edge 15 and the front end cutting edge 9 adjacent to the long cutting edge 15 on the front side in the rotation direction X2 may be indicated by ψ5.

If the spacing angle ψ4 is smaller than the spacing angle ψ5, the first short cutting edge 17a may be less susceptible to an excessive cutting load, and the cutting process can be stably carried out by the long cutting edges 15.

As described earlier, the long cutting edges 15 and the short cutting edges 17 may individually include the convex curvilinear shaped portion in the direction toward the front side in the rotation direction X2. The long cutting edges 15, the second short cutting edge 17b, the third short cutting edge 17c and the fourth short cutting edge 17d may have the convex curvilinear shape as a whole in the non-limiting embodiment illustrated in FIG. 3.

As in the non-limiting embodiment illustrated in FIG. 3, the first short cutting edge 17a may include a first portion 17a1 having a convex curvilinear shape and a second portion 17a2 having a straight line shape if the main body 3 is viewed toward the first end 3a. The first portion 17a1 may be located on a relatively outer peripheral side and may have a convex curvilinear shape protruding toward the front side in the rotation direction X2. The second portion 17a2 may have a straight line shape that extends from an end portion at a side near the rotation axis X1 in the first portion toward the rear side in the rotation direction X2.

The first short cutting edge 17a may have enhanced durability if the first short cutting edge 17a includes the first portion 17a1 and the second portion 17a2. The first short cutting edge 17a located between the short cutting edges (the second short cutting edge 17b and the third short cutting edge 17c) may be usable as the pseudo long cutting edge 15. Hence, a large load may tend to be applied to an end portion of the first short cutting edge 17a which is located at a side near the rotation axis X1. However, the first short cutting edge 17a may have the high durability because the second portion 17a2 having the straight line shape is located at the portion of the first short cutting edge 17a which is susceptible to the large load.

Particularly in cases where the first short cutting edge 17a includes the first portion 17a1 and the second portion 17a2, the first short cutting edge 17a may have further enhanced durability if an angle formed by the first portion 17a1 and the second portion 17a2 is an obtuse angle when the main body 3 is viewed toward the first end 3a. This may be because the first short cutting edge 17a in the vicinity of a boundary between the first portion 17a1 and the second portion 17a2 has the enhanced durability.

The main body 3 may include, as a cutting edge for cutting out a workpiece, another cutting edge in addition to the above front end cutting edges 9 in the non-limiting embodiments. Specifically, the main body 3 may include, for example, a cutting edge located on at least a part of a ridge line where a region of the flute 11 on a rear side in the rotation direction X2 intersects with an outer peripheral surface of the main body 3. This cutting edge is usually called an outer peripheral cutting edge.

A size of the main body 3 is not limited to a specific size. For example, a diameter (outer diameter) D of the main body 3 may be settable to 5-40 mm. A length of the cutting part 7 in a direction along the rotation axis X1 may be settable to approximately 1.5D mm to 25D mm.

The outer diameter of the main body 3 may be constant or changed from a side of the first end 3a to a side of the second end 3b. For example, the outer diameter of the main body 3 may be decreased from the side of the first end 3a to the side of the second end 3b.

Examples of materials of the main body 3 may include metal, cemented carbide, cermet and ceramics. Examples of the metal may include stainless steel and titanium. Examples of compositions of the cemented carbide may include WC(tungsten carbide)-Co(cobalt), WC—TiC(titanium carbide)-Co, WC—TiC—TaC(tantalum carbide)-Co and WC—TiC—TaC—$Cr_3C_2$(chrome carbide)-Co. Here, WC, TiC, TaC and $Cr_3C_2$ may be hard particles, and Co may be a binding phase.

The cermet may be a sintered composite material obtainable by compositing metal into a ceramic component. Specific examples of the cermet may include those composed mainly of a titanium compound, such as TiC or TiN (titanium nitride). Examples of the ceramics may include $Al_2O_3$ (aluminum oxide), $Si_3O_4$(silicon nitride) and cBN (Cubic Boron Nitride).

The main body 3 may be composed only of the above material or, alternatively, may include a member composed of the above material and a coating layer that covers the member. Examples of material constituting the coating layer may include diamond, diamond-like carbon (DLC), TiC, TiN, TiCN (titanium carbonitride), TiMN (M is at least one kind of metal element selected from metals in periodic tables 4, 5 and 6, except for Ti, and Al and Si) and $Al_2O_3$.

If the main body 3 includes the above coating layer, it may be possible to improve wear resistance of the cutting edges. In particular, if the coating layer includes diamond, the end mill 1 may demonstrate good wear resistance even if a workpiece is a ceramic material.

The coating layer can be deposited by, for example, vapor phase synthesis method. Examples of the vapor phase synthesis method may include chemical vapor deposition (CVD) method or physical vapor deposition (PVD) method. A thickness of the coating layer may be settable to, for example, 0.3-20 μm. A suitable range may differ depending on the composition of the coating layer.

Although the end mills 1 in the non-limiting embodiments have been illustrated and described above, the present invention is not limited thereto. It may be, of course, possible to make any arbitrary ones insofar as they do not depart from the gist of the present invention.

<Method for Manufacturing Machined Product>

Figure 7:
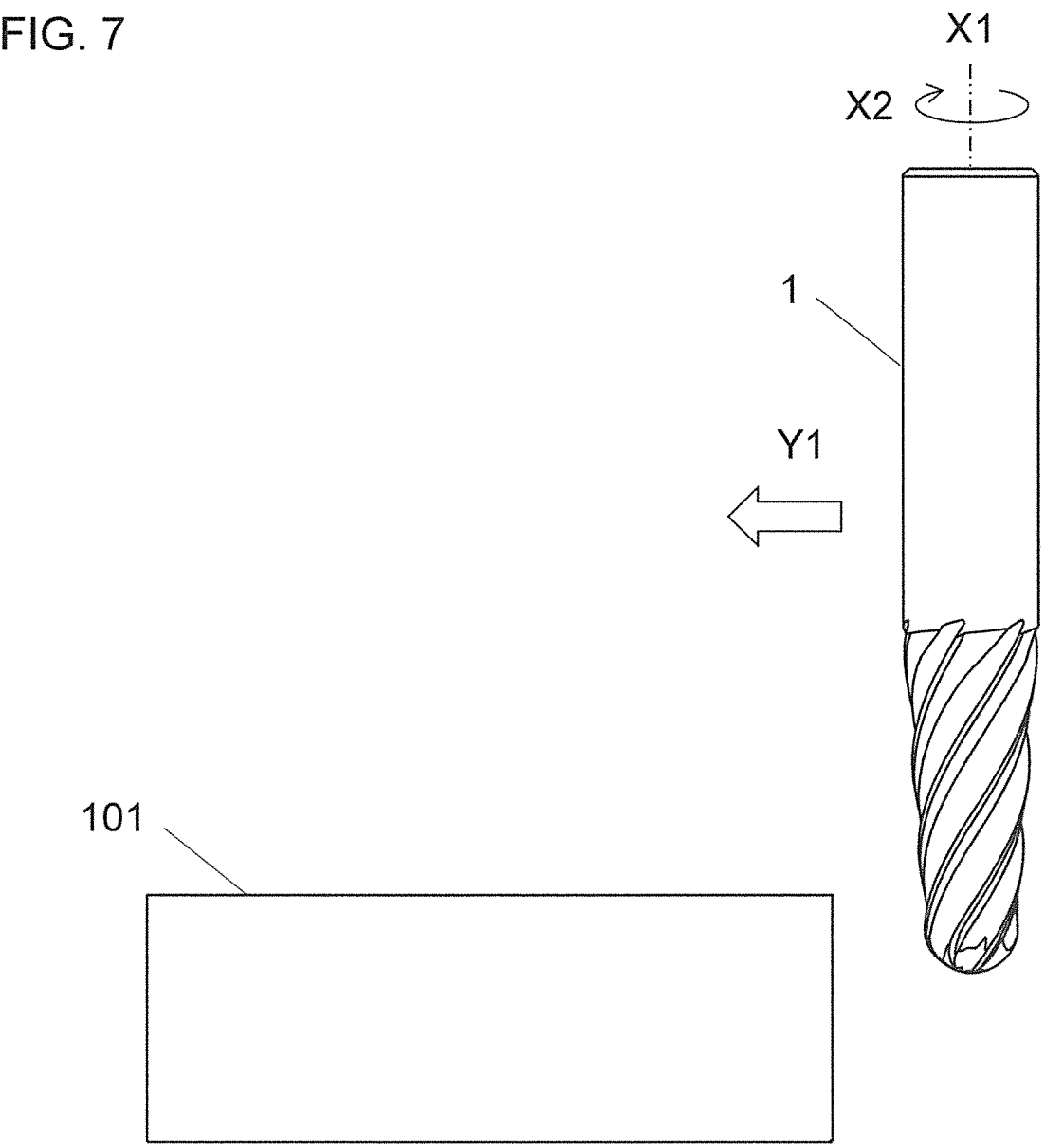
FIG. 7 is a perspective view illustrating one step in a method for manufacturing a machined product in a non-limiting embodiment.
Figure 8:
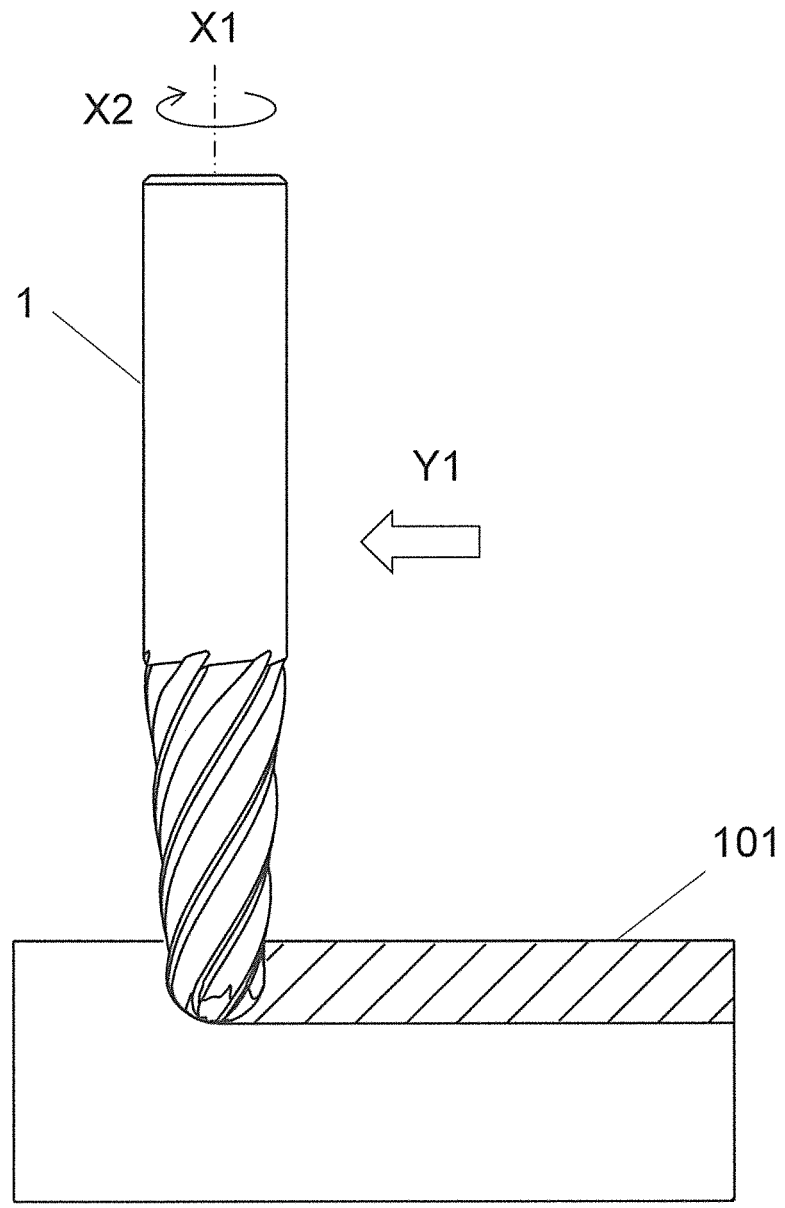
FIG. 8 is a perspective view illustrating one step in the method for manufacturing a machined product in a non-limiting embodiment.
Figure 9:
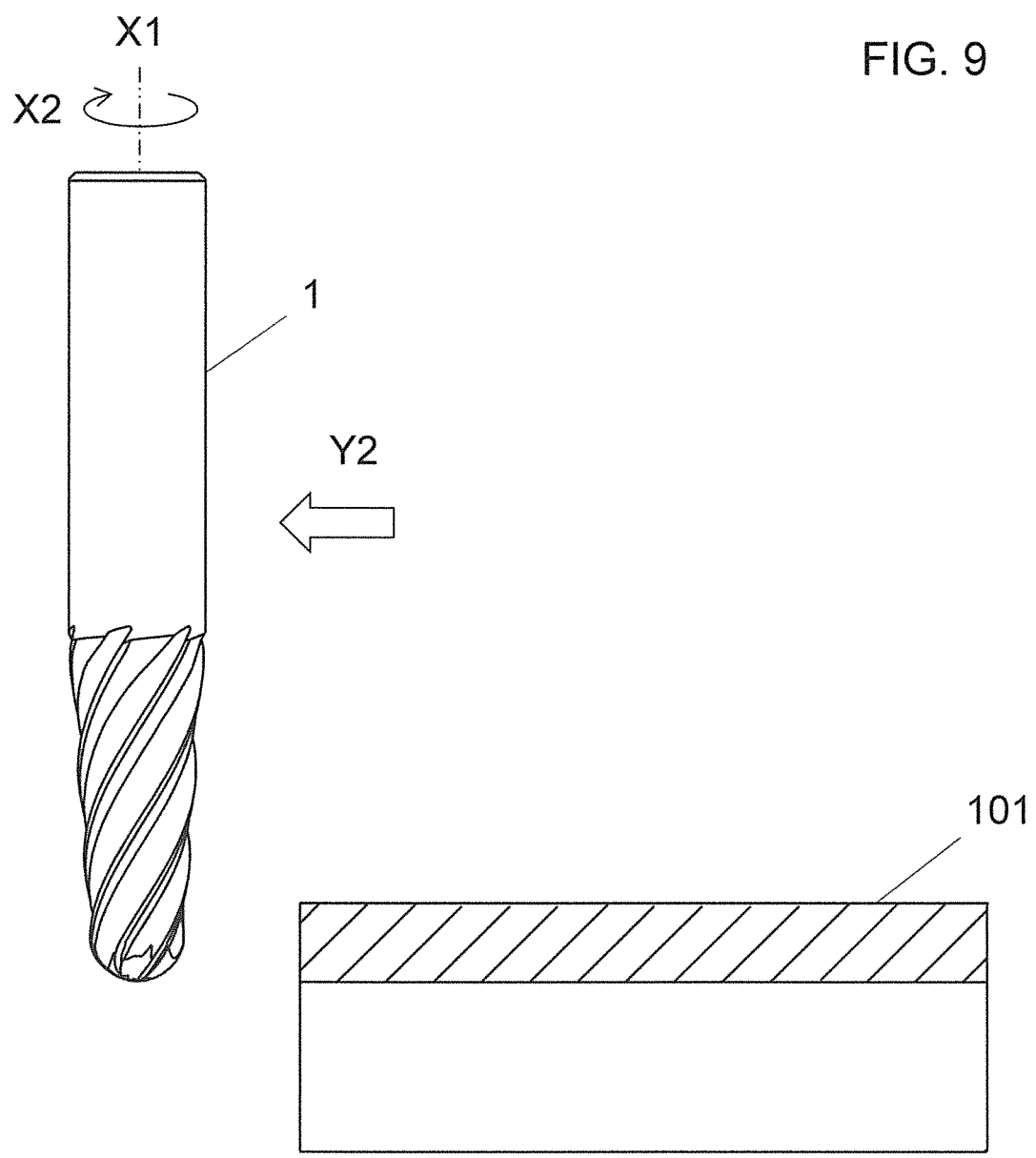
FIG. 9 is a perspective view illustrating one step in the method for manufacturing a machined product in a non-limiting embodiment.

A method for manufacturing a machined product in a non-limiting embodiment may be described in detail below by exemplifying the case of using the end mill 1 in the foregoing non-limiting embodiments. The following description may be made with reference to FIGS. 7 to 9. FIGS. 7 to 9 may illustrate the steps in a shouldering process of a workpiece as a non-limiting embodiment of the method for manufacturing a machined product. For the purpose of facilitating a visual understanding, hatching may be applied to a machined surface cut out by the end mill 1 in FIGS. 8 and 9.

The method for manufacturing a machined product in the present non-limiting embodiment may include the following steps (1) to (3).

The step (1) may be to bring the end mill 1 near the workpiece 101 in Y1 direction by rotating the end mill 1 in an arrow X2 direction around a rotation axis (refer to FIG. 7).

This step may be carried out by, for example, fixing the workpiece 101 onto a table of a machine tool with the end mill 1 attached thereto, and then by bringing the end mill 1 being rotated near the workpiece 101. In this step, the workpiece 101 and the end mill 1 may be brought near each other. For example, the workpiece 101 may be brought near the end mill 1.

The step (2) may be to cut out the workpiece 101 by bringing the end mill 1 nearer the workpiece 101 so that the end mill 1 being rotated is brought into contact with a desired position on a surface of the workpiece 101 (refer to FIG. 8).

In this step, the front end cutting edges may be brought into contact with the desired position on the surface of the workpiece 101. Examples of the cutting process may include a grooving process and a milling process besides the shouldering process as illustrated in FIG. 8.

The step (3) may be to move the end mill 1 away from the workpiece 101 in Y2 direction (refer to FIG. 9).

Also in this step, the end mill 1 may be relatively separated from the workpiece 101 as is the case with the above step (1). For example, the workpiece 101 may be moved away from the end mill 1.

Excellent machinability can be provided through the foregoing steps.

If the cutting process of the workpiece 101 as described above is carried out a plurality of times, specifically, for example, if a plurality of kinds of cutting processes are applied to the single workpiece 101, the step of bringing the end mill 1 into contact with different portions of the workpiece 101 while keeping the end mill 1 rotating may be repeated.

DESCRIPTION OF REFERENCE NUMERALS 1 rotary tool (end mill)
3 main body
3a first end
3b second end
5 holding part
7 cutting part
9 cutting edge (front end cutting edge)
11 flute
13 end surface
15 long cutting edge
15a first long cutting edge
15b second long cutting edge
17 short cutting edge
17a first short cutting edge
17a1 first portion
17a2 second portion
17b second short cutting edge
17c third short cutting edge
17d fourth short cutting edge
101 workpiece

What is claimed is:

1. An end mill, comprising:
a main body having a bar shape extending from a first end to a second end, the main body configured to rotate around a rotation axis;
the main body comprising:
a plurality of cutting edges located at a side of the first end, and
a plurality of flutes individually extending from the plurality of cutting edges toward the second end;
in a frontal view of the first end, the plurality of cutting edges comprise:
a plurality of long cutting edges extending from the rotation axis toward an outer periphery, and
a plurality of short cutting edges extending from a position
starting away from the rotation axis toward the outer periphery;
the plurality of long cutting edges comprise a first long cutting edge,
a value N1 is a total number of the short cutting edges located between the first long cutting edge and an adjacent long cutting edge of the plurality of long cutting edges located at a forward and sequentially adjacent position in a rotation direction with respect to the first long cutting edge,
a value N2 is a total number of the short cutting edges located between the first long cutting edge and an adjacent long cutting edge of the plurality of long cutting edges located at a rearwards and sequentially adjacent position that is opposite to the rotation direction with respect to the first long cutting edge, and
the value N1 is different from the value N2.

2. The end mill according to claim 1,
wherein the value N1 and the value N2 are each 1 or more.

3. The end mill according to claim 1,
wherein, a number of the plurality of cutting edges is four or more,
one of the plurality of cutting edges is a first cutting edge, and
in a frontal view of the first end, a spacing angle formed by the first cutting edge and a cutting edge of the plurality of cutting edges adjacent to the first cutting edge in a forward position in the rotation direction is different from a spacing angle formed by the first cutting edge and a cutting edge of the plurality of cutting edges adjacent to the first cutting edge in a rearwards position that is opposite to the rotation direction, and a spacing angle formed by the first cutting edge and a cutting edge of the plurality of cutting edges located opposite to the first cutting edge on a basis of the rotation axis is 180°.

4. The end mill according to claim 1,
wherein the plurality of short cutting edges comprise:
   a first short cutting edge;
   a second short cutting edge adjacent to the first short cutting edge in a forward position in the rotation direction; and
   a third short cutting edge adjacent to the first short cutting edge in a rearwards position that is opposite to the rotation direction; and
   in a frontal view of the first end, the first short cutting edge extends closer to the rotation axis than the second short cutting edge and the third short cutting edge.

5. The end mill according to claim 4,
wherein, in a frontal view of the first end, the first short cutting edge extends closest to the rotation axis of the plurality of short cutting edges.

6. The end mill according to claim 4,
wherein, in a frontal view of the first end, the second short cutting edge extends closer to the rotation axis than the third short cutting edge.

7. The end mill according to claim 6,
wherein, in a frontal view of the first end, the third short cutting edge is located farthest away from the rotation axis of the plurality of short cutting edges.

8. The end mill according to claim 4,
wherein, in a frontal view of the first end, a spacing angle formed by the first short cutting edge and the second short cutting edge is smaller than a spacing angle formed by any long cutting edge of the plurality of long cutting edges and a cutting edge of the plurality of cutting edges adjacent to said any long cutting edge in a forward position in the rotation direction.

9. The end mill according to claim 4,
wherein, in a frontal view of the first end, the first short cutting edge comprises:
   a first portion which has a convex curvilinear shape and protrudes forward in the rotation direction, and
   a second portion having a straight line shape and extending rearwards, opposite to the rotation direction, from an end portion of the first portion which is located at a side near the rotation axis.

10. The end mill according to claim 9,
wherein, in a frontal view of the first end, an angle formed by the first portion and the second portion is an obtuse angle.

11. A method for manufacturing a machined product, comprising:
   rotating the end mill according to claim 1;
   bringing the end mill being rotated into contact with a workpiece; and
   moving the end mill away from the workpiece.

12. The end mill according to claim 1,
wherein the adjacent long cutting edge of the plurality of long cutting edges located at a forward position in the rotation direction with respect to the first long cutting edge and the adjacent long cutting edge of the plurality of long cutting edges located at a rearwards position opposite to the rotation direction with respect to the first long cutting edge are the same long cutting edge.

\* \* \* \* \*